US008214882B2

(12) United States Patent
Kegel et al.

(10) Patent No.: US 8,214,882 B2
(45) Date of Patent: *Jul. 3, 2012

(54) SERVER DISCOVERY, SPAWNING COLLECTOR THREADS TO COLLECT INFORMATION FROM SERVERS, AND REPORTING INFORMATION

(75) Inventors: Andrew G. Kegel, Redmond, WA (US); Deepa Srinivasan, Morrisville, NC (US); Steven D. Cook, Tigard, OR (US); Robert S. Smith, Dupont, WA (US)

(73) Assignee: International Business Machines Corporation, Armonk, NY (US)

( * ) Notice: Subject to any disclaimer, the term of this patent is extended or adjusted under 35 U.S.C. 154(b) by 454 days.

This patent is subject to a terminal disclaimer.

(21) Appl. No.: 12/176,404

(22) Filed: Jul. 20, 2008

(65) Prior Publication Data

US 2008/0281964 A1 Nov. 13, 2008

Related U.S. Application Data

(63) Continuation of application No. 10/847,534, filed on May 17, 2004, now Pat. No. 7,506,361.

(51) Int. Cl.
 *G06F 7/04* (2006.01)
(52) U.S. Cl. ............................................. 726/3; 709/224
(58) Field of Classification Search ......... 726/3; 709/217, 709/223–224, 229; 718/105, 1
 See application file for complete search history.

(56) References Cited

U.S. PATENT DOCUMENTS

| | | | |
|---|---|---|---|
| 6,301,615 B1 * | 10/2001 | Kutcher ......................... | 709/224 |
| 6,457,142 B1 * | 9/2002 | Klemm et al. ............. | 714/38.12 |
| 6,516,348 B1 | 2/2003 | MacFarlane et al. | |
| 6,789,160 B2 * | 9/2004 | Suresh ........................... | 711/104 |
| 7,051,098 B2 * | 5/2006 | Masters et al. ................ | 709/224 |
| 7,130,812 B1 | 10/2006 | Iyer et al. ........................ | 705/10 |

(Continued)

FOREIGN PATENT DOCUMENTS

WO WO 0135242 A1 * 5/2001

OTHER PUBLICATIONS

August Celentano et al., Knowledge-based document retrieval in office environments: the Kabiria system, ACM Transactions on Information Systems, vol. 13, No. 3, Jul. 1995, pp. 237-268.

(Continued)

*Primary Examiner* — Samson Lemma
(74) *Attorney, Agent, or Firm* — Thomas Tyson (57) ABSTRACT

Server discovery, spawning collector threads to collect information from servers, and reporting such information, is disclosed. A method of one embodiment determines a number of servers communicatively coupled to a network. For each server, a collector thread is spawned to collect information regarding the server by sending requests to the server and receiving responses from the server. The collector threads can be spawned by and run on a computing device other than the number of servers, such that no computer-executable code is installed on the servers for collecting the information. Upon completion of the collector thread for each server, the information regarding the server as collected is stored to a database by one or more writer threads. The information may include dynamic load-oriented and function-oriented information regarding the servers, as well as static configuration information, from which server utilization-oriented statistics may be distilled to identify candidate servers for server consolidation.

30 Claims, 6 Drawing Sheets

U.S. PATENT DOCUMENTS

| | | |
|---|---|---|
| 7,181,743 B2 | 2/2007 | Werme et al. .................. 718/104 |
| 7,412,709 B2 * | 8/2008 | Branson et al. ................ 719/328 |
| 2002/0073115 A1 | 6/2002 | Davis |
| 2002/0188522 A1 | 12/2002 | McCall et al. |
| 2005/0251802 A1 * | 11/2005 | Bozek et al. ...................... 718/1 |
| 2006/0173875 A1 | 8/2006 | Stefaniak ....................... 707/101 |
| 2006/0179124 A1 | 8/2006 | Stefaniak et al. .............. 709/219 |
| 2006/0179171 A1 | 8/2006 | Stefaniak et al. ................ 710/15 |
| 2006/0179431 A1 | 8/2006 | Devanathan et al. ......... 717/168 |

OTHER PUBLICATIONS

Piero Fraternali, Tools and approaches for developing data-intensive web applications: a survey, ACM Computing Surveys, vol. 31, No. 3, Sep. 1999.

* cited by examiner

SERVER DISCOVERY, SPAWNING COLLECTOR THREADS TO COLLECT INFORMATION FROM SERVERS, AND REPORTING INFORMATION

RELATED APPLICATIONS

The present patent application is a continuation of the previously filed and pending patent application having the Ser. No. 10/847,534, filed on May 17, 2004.

FIELD OF THE INVENTION

The present invention relates generally to server discovery, collecting information from servers communicatively coupled to a network, and reporting the server information for purposes such as server consolidation, and relates more particularly to collecting such information by spawning collector threads.

BACKGROUND OF THE INVENTION

A server computing device, or a server, is generally a computer system within a network that is shared by client computing devices, or clients, or otherwise shared by multiple users. Types of servers can include application servers, file servers, intranet servers, e-mail servers, electronic commerce servers, print servers, proxy servers, and web servers, among other kinds of servers. Larger organizations may have tens, hundreds, or even thousands of different servers deployed on their networks worldwide.

Although organizations attempt to deploy servers in an organized fashion, in many cases servers are deployed more haphazardly. As a result, many organizations do not have a clear inventory of the number and types of servers that are functioning on their networks. Some servers may be performing duplicative functionality. Some servers may be operating at far less than maximum capacity, in terms of either storage capacity, processing capacity, or both, which is inefficient, whereas other servers may be operating at near maximum capacity, which can result in delays and system crashes. Many networks are heterogeneous environments, in which there are servers of many different types, from many different vendors, resulting in different types of system management solutions that have to be employed to manage all the servers on the network.

As organizations are attempting to get a handle on and even decrease their information technology (IT) costs, they are frequently attempting to obtain a clear picture of their server inventories. One motivation for doing so is to try to determine which servers are candidates for consolidation. For example, servers that are performing duplicative functionality, and servers that are operating at far less than their maximum capacity, are candidates for consolidating their duties with other servers.

One manner by which server inventories can be obtained is to manually populate a report or list of all the servers within a given organization. However, this approach is tedious, expensive, and can result in an inaccurate picture of the servers deployed on a network. For example, the data of the report may be populated from different, and potentially unreliable, data sources. As a result, the report may not be of much use in attempting to consolidate servers. Some servers may be overlooked and not be represented in the report, whereas other servers may have erroneous information regarding their capabilities and/or capacities added to the list.

Another manner by which server inventories can be obtained is to unleash agents, or bots, onto the network. The agents are small computer programs executed on the individual servers, collecting information regarding the servers on which they are running, and reporting back the information for consolidation into a report. However, this approach can be harmful to the overall health of the network. Some servers may not easily accept the running of foreign computer programs, and as a result may crash, causing potentially mission critical functionality to fail. Other servers may be incompatible with the agents, resulting in these servers not being tallied within the report. Overall, unleashing agents onto the servers of a network generally at the very least slows down response time of the network, which can frustrate users.

Furthermore, unleashing agents onto hundreds or thousands of servers becomes impracticable, especially when the network administrator does not have an accurate inventory of the servers connected to a network. Indeed, if the server inventory is inaccurate, then it becomes nearly impossible to install agents on all the servers, since all of the servers are not known a priori. Additionally, the agents usually have to be manually removed after they have collected the needed data, which further adds to costs is another area in which errors can occur. For these and other reasons, therefore, there is a need for the present invention.

SUMMARY OF THE INVENTION

A method of one embodiment of the invention determines a number of servers communicatively coupled to a network. For each server, a collector thread is spawned to collect information regarding the server by sending requests to the server and receiving responses from the server. Upon completion of the collector thread for each server, the information regarding the server as collected is stored to a database.

A method of another embodiment of the invention assists selection of one or more servers from a number of servers for server consolidation, and spawns collector threads on a computing device other than one of the servers to collect server consolidation-related information from the servers. The server consolidation-related information is distilled to determine server utilization-oriented statistics regarding the servers. The server utilization-oriented statistics regarding the servers are reported, to inform selection of the one or more servers for server consolidation.

A computing device of an embodiment of the invention includes one or more processors, one or more network communication mechanisms, and a computer-readable medium. The network communication mechanisms enable the computing device to communicatively couple to a network having a number of servers. The computer-readable medium stores a computer program executable by the processors to collect dynamic load-oriented and function-oriented information and static configuration information regarding the servers without installing any computer-executable code on the servers and without writing any information to the servers.

A computing device of another embodiment of the invention includes one or more communication mechanisms and a means. The network communication mechanisms enable the computing device to communicatively couple to a network having a number of servers. The means is for collecting information regarding the servers via collector threads to inform selection of one or more of the servers for server consolidation.

An article of manufacture of an embodiment of the invention includes a computer-readable medium and means in the medium. The means is for collecting information regarding the servers without installing any computer-executable code on the servers to inform selection of one or more of the servers for server consolidation.

A system of an embodiment of the invention includes a network, a number of servers, and a computing device. The servers are communicatively coupled to the network. The computing device is also communicatively coupled to the network. The computing device collects information regarding the servers without installing computer-executable code on the servers to assist selection of one or more of the servers for server consolidation.

Embodiments of the invention provide for advantages over the prior art. User intervention within the process of collecting information regarding servers on a network is minimal to non-existent. A computing device, such as a laptop computer, may be connected to the network, and spawn collector threads for the servers that are executed by the computing device and that query the servers for the desired information. Because no computer-executable code is desirably installed, loaded, or run on the servers for this purpose, information collection results in negligible or no decrease in overall network performance, as well as in negligible or no decrease in overall server performance. Furthermore, because the information is not collected manually or from potentially unreliable data sources, the information regarding the servers is highly accurate, and does not miss or overlook any of the servers on the network. Indeed, the only servers that potentially may be missed are those that are not currently running, due to having recently been crashed and still rebooting, having lost power, and so on. The result is that more informed decisions regarding server consolidation can be made.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview, System, and Computing Device

Figure 1:
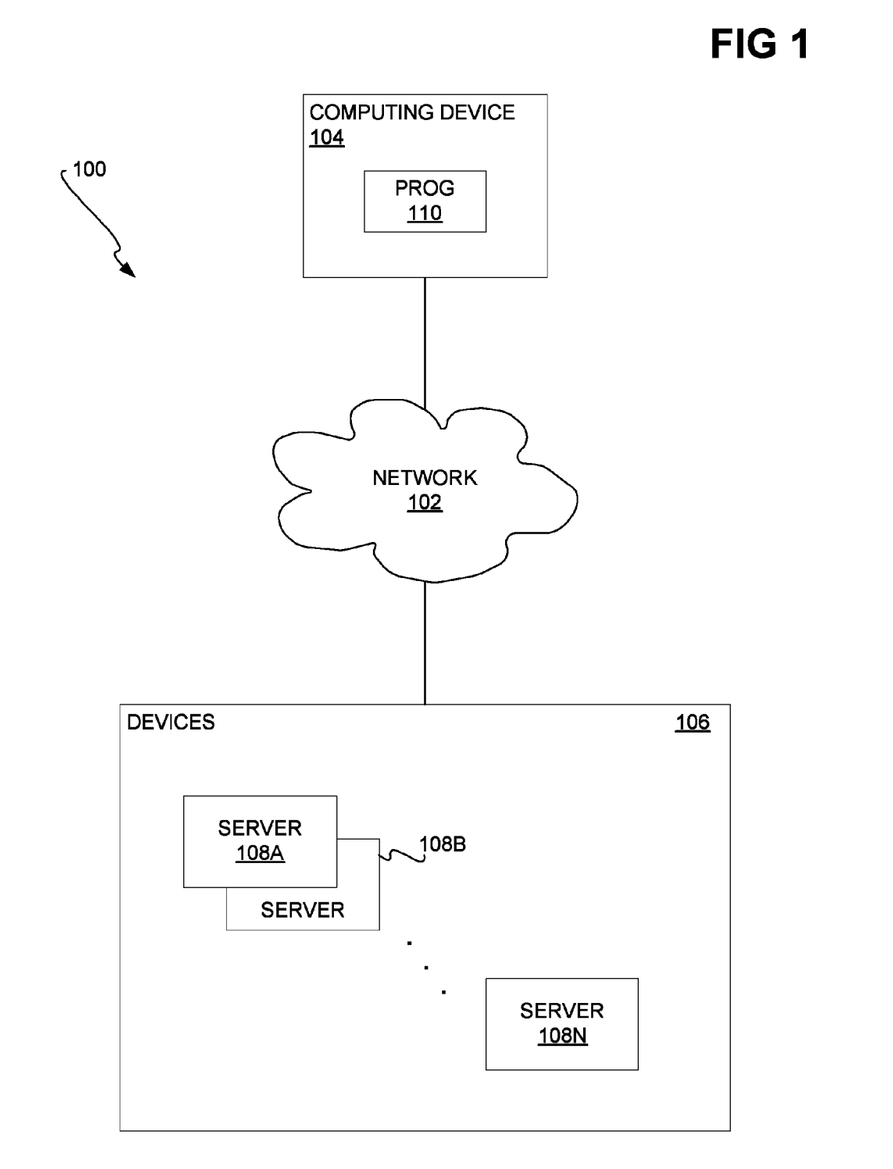
FIG. 1 is a diagram of a system including a computing device and a number of servers connected via a network, where the computing device is able to collect information from the servers without installing any computer-executable code on the servers, according to an embodiment of the invention.

FIG. 1 shows a system 100, according to an embodiment of the invention. The system 100 includes a network 102, to which a computing device 104 and a number of devices 106 are communicatively coupled. The network 102 may be or include local-area networks (LAN's), wide-area networks (WAN's), intranets, extranets, the Internet, wireless networks, wired networks, and/or telephony networks, as well as other types of networks. The computing device 104 may be or include a computer, such as a desktop, laptop, or notebook computer, as well as a personal-digital assistance (PDA) device, a handheld computer, a mobile phone with computing capability, and so on. The computing device 104 in one embodiment of the invention is temporarily connected to the network 102 to communicate with the devices 106, and once desired functionality has been performed, is disconnected from the network 102.

The devices 106, by comparison, are considered to be more indefinitely connected to the network 102. For instance, the devices 106 may be the devices that are owned or operated by an organization, such as a corporation or other entity, whereas the computing device 104 may be a device that is brought into the organization by a different entity. The devices 106 include servers 108A, 108B, . . . , 108N, which are collectively referred to as the servers 108. The servers 108 are specifically the subjects of the functionality performed by the computing device 104 when temporarily connected to the network 102. A server is generally a computer system within a network that is shared by client computing devices, or clients, or otherwise shared by multiple users. The devices 106 may also include types of devices other than servers, such as client computing devices, printing devices, scanning devices, facsimile devices, and so on.

The computing device 104 includes a computer program 110 installed and executable thereon. A computer program may be generally considered as a collection of computer-executable instructions that instruct a computing device what functionality is to be performed. The computer program 110 specifically collects information regarding the servers 108 without installing any computer-executable code on the servers 108 and without writing any information to the servers 108. Such computer-executable code may be considered a computer program, such as an agent or a bot that is unleashed from one computing device, such as the computing device 104, to another computing device, such as any of the servers 108. The information collected from the servers 108 is in one embodiment intended to inform selection of one or more of the servers 108 for server consolidation.

Server consolidation is the process of replacing two or more servers with a lesser number of servers, such as one server. For example, a first server and a second server may be replaced by just the first server, by just the second server, or by a third server, where in the latter case both the first and the second servers are retired. Candidate servers for server consolidation may be performing duplicative functionality, so that they can be consolidated into a lesser number of servers. Candidate servers for server consolidation may be performing at far less than maximum capacity, in terms of either storage capacity, processing capacity, or both. Candidate servers for server consolidation may further be relatively outdated or somewhat obsolete.

The information collected by the computer program 110 from the servers 108 may include static configuration information regarding the servers as well as dynamic load-oriented and function-oriented information. For instance, static configuration information includes information regarding a server that is relatively unchanging in nature over a period of time, such that it can be considered static. Such information may include the model and manufacturer of the server, the number and type of processors installed on the server, the amount and type of memory installed on the server, and the number, type, and size of hard disk drives or other storage mechanisms installed on the server. Static information can be collected once from each server, since the information is not likely to change if collected again minutes, hours, days, or even weeks later.

By comparison, dynamic load-oriented and function-oriented information includes information regarding a server that changes over a period of time, such that it can be considered dynamic. Dynamic information is collected a number of times from each server over a period of time, such the information is likely to be at least somewhat different each time it is collected. Dynamic load-oriented information refers to information regarding the current load of the server, from a perspective of the processor, memory, and/or hard disk drive, and so on, of the server. For instance, at a given point in time, 70% of the processing power of the server may be in use, 65% of the memory of the server may be in use, and 45% of the hard disk drive may be full. Dynamic function-oriented information refers to information regarding the current functions being performed by the server. For example, at a given point in time, function-oriented information may include the number, type, and identity of the computer programs, processes, and/or threads, currently running on a server.

Figure 2:
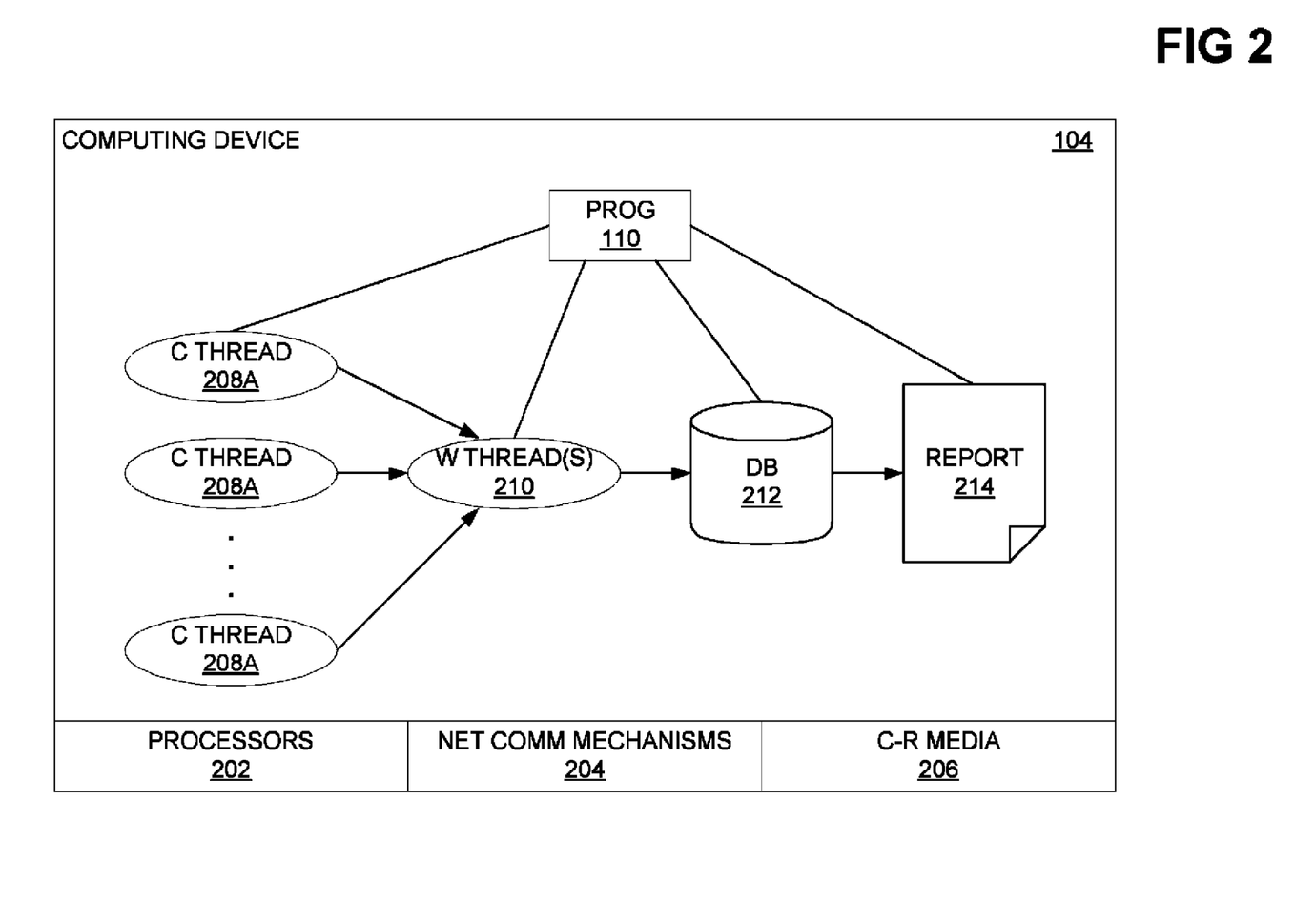
FIG. 2 is a diagram of a computing device that includes a computer program that is able to launch collector threads to collect information from servers without installing any computer-executable code on the servers, according to an embodiment of the invention.

FIG. 2 shows the computing device 104 in more detail, according to an embodiment of the invention. Hardware of the computing device 104 includes one or more processors 202, one or more network communication mechanisms 204, and one or more computer-readable media 206. The processors 202 execute or run the computer program 110. The network communication mechanisms 204 may include network adapters or other types of mechanisms 204 that enable the computing device 104 to communicatively connect to the network 102 of FIG. 1.

The computer-readable media 206 may include volatile and/or non-volatile memory, and may include semiconductor memory, such as volatile random access memory (RAM), read-only memory (ROM), or non-volatile flash memory, magnetic media, such as hard disk drives, tape drives, and floppy drives, and/or optical media, such as compact disc (CD)-ROM and digital versatile disc (DVD) drives, as well as other types of computer-readable media. The terminology computer-readable media is inclusive of the phrases and terms storage mechanism and storage, too. The computer program 110 can be stored on and/or executed from the computer-readable media 206. Furthermore, the database 212 and the report 214, as are described in more detail later in the detailed description, can be stored on the computer-readable media 206.

The computer program 110 is able to discover the devices 106 of FIG. 1 that are communicatively connected to the network, and determine which of those devices 106 are the servers 108 of FIG. 1. In one embodiment of the invention, discovery of the devices 106 that are communicatively coupled to the network may be accomplished by concurrently using multiple threads that seek out different ranges of Internet Protocol (IP) addresses, or other types of network addresses. For instance, each thread may be responsible for determining whether a given range of IP addresses have devices attached thereto. The same threads may further be responsible for then determining whether those devices are servers, by requesting information from the devices.

Alternatively, a different thread or threads may be spawned to determine whether the devices that have been discovered are servers, or a given thread may be employed to determine whether the devices are of a particular type of server, such that there is a thread to seek out servers running each different kind of operating system being investigated. As new types of servers need to be discerned, additional code for threads that seek out these types of servers may then be added without modifying the code for existing threads. The discovery process does not write information to the devices or servers, nor does it install computer-executable code, such as computer programs, on the devices or servers. The server discovery process is thus scalable and flexible.

For each of the servers 108, the computer program 110 spawns one of a number of collector threads 208A, 208B, . . . , 208M, which are collectively referred to as the collector threads 208. A thread is a computer-executable stream, process, computer program, or section of code that is part of a larger computer program, which in this case is the computer program 110. The collector threads 208 collect the server consolidation-related or server consolidation-needed information from the servers 108. Such information can include the dynamic load-oriented and function-oriented information as well as the static configuration-oriented information that has been described. The collector threads 208 may exist for a specified period of time, so that the dynamic information in particular can be collected from the servers 108 at different points in time during the specified period.

In at least some embodiments of the invention, the collector threads 208 are executed on the computing device 104, such as by the processors 202 of the computing device 104, and are not installed and/or executed on the servers 108 themselves. For example, the collector threads 208 may send requests to and receive responses from the servers 108 in order to obtain the desired information from the servers 108. More specific approaches for the collector threads 208 to collect information from the servers 108, as well as specific architecture implementations inclusive of the collector threads 208, are described in subsequent sections of the detailed description.

When each of the collector threads 208 has finished collecting information, the computer program 110 spawns one of the writer threads 210, such that for multiple of the collector threads 208, multiple of the writer threads 210 can be spawned in one embodiment of the invention. In another embodiment of the invention, a single writer thread 210 may be spawned. The writer threads 210 store the information collected by the collector threads 208 to a database 212. The information stored at the database 212 is then analyzed, collated, and/or distilled by the computer program 110, with or without user assistance or intervention, into server utilization-oriented statistics that can be provided in a report 214 to inform or assist selection of one or more of the servers 108 for server consolidation. For instance, the server utilization-oriented statistics may group servers by type, manufacturer, functionality being performed, and so on, and indicate within each group the average load, or utilization, of each server. From this information, a network administrator or consultant may make an informed decision as to which of the servers 108 can be profitably consolidated into new servers or into existing servers.

Methods

Figure 3:
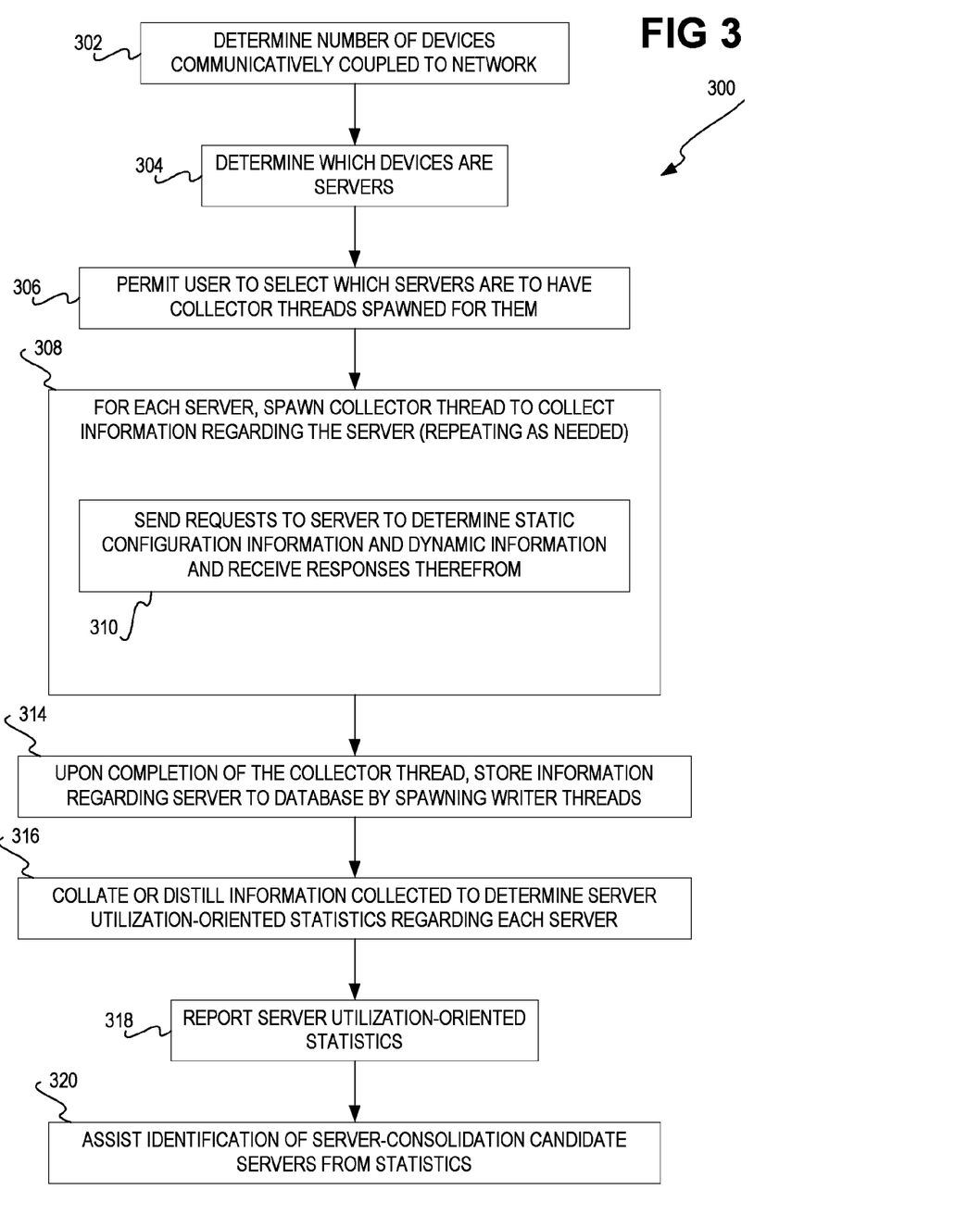
FIG. 3 is a flowchart of a method for collecting, distilling, and reporting information to be used in conjunction with server-consolidation candidate identification, according to an embodiment of the invention.

FIG. 3 shows a method 300 for assisting in server consolidation, according to an embodiment of the invention. The method 300 may be performed in part or in whole by the computer program 110 of the computing device 104 of FIGS. 1 and 2. The method 300 is specifically described in relation to the embodiments of the invention described in relation to FIGS. 1 and 2. However, such specific description is provided for illustrative clarity only, and other embodiments of the invention can perform the method 300 in relation to systems other than the system 100 of FIG. 1 and in relation to computing devices other than the computing device 104 of FIGS. 1 and 2.

The method 300 determines the number and type of devices 106 that are communicatively coupled to the network 102 (302), which may be phrased as discovery of the devices 106 on the network 102. From this information, the method 300 determines which of the devices 106 are the servers 108 that are the subject of the server consolidation analysis being performed (304). For example, in an Internet Protocol (IP)-type network, each different IP address of each subnet of the network 102 may be queried. In response to such queries, the devices 106 return information indicative of their type and other identifying information. Where the information returned from one of the devices 106 indicates that the device is a server, the method 300 concludes that the device is one of the servers 108. Initial information retrieved in 302 can further identify the operating system (OS) and/or server software running on the server, such as versions of the Microsoft® Windows® operating system, as well as version of the Linux® operating system, versions of the UNIX® operating system, and so on.

The user may optionally be permitted to select which of the servers 108 identified are to have collector threads spawned for them (306). Alternatively, all of the servers 108 may be included by default in the server consolidation analysis. User selection of just some of the servers 108 may speed analysis, where, for instance, an organization is attempting to just consolidate certain servers on certain subnets, servers running a particular type of OS, and so on. Such user selection can be provided via a graphical user interface (GUI), or in another manner.

For each of the selected servers 108, then, one of the collector threads 208 is spawned to collect information regarding the server (308). The collector threads 208 are spawned by the computer program 110 and are executed on the computing device 104. That is, no computer-executable code, such as agents or bots, is installed on any of the servers 108. The collector threads 208 first send requests to the servers 108 to determine static configuration information regarding them, and/or to determine dynamic load-oriented and function-oriented information regarding them, and receive responses from the servers 108 providing this information (310). The spawning process in 308 and the request sending and response receiving by the collect threads 208 in 310, may be repeated as needed so that the dynamic information, which can change over time, is gathered periodically over a length of time. For example, the method 300, per user instruction via a graphical user interface (GUI), may use the operating system's scheduling mechanism to execute instances of the spawning process in 308 at specified intervals, so that the collector threads 208 are appropriately spawned to periodically collect the desired information in 310. The static configuration information, as well as the dynamic load-oriented and function-oriented information, can be that information which has been described in the previous section of the detailed description.

The requests that are sent in 310 and 312 are sent over the network 102 from the computing device 104 to the servers 108, where both the computing device 104 and the servers 108 are communicatively connected to the network 102. The requests may be sent in IP-defined packets of data, and may address predetermined application programming interfaces (API's) of the servers 108 which are callable to provide the information needed for the server consolidation analysis. For example, the predetermined API's may be API's provided by the Microsoft Windows® operating system, such as networking API's, registry API's, and so on. Requests may be sent using the Simple Network Management Protocol (SNMP), and, for the UNIX® operating system, requests may be sent using remote command execution via the telnet, remote shell, or secure shell protocol. Such requests travel over the network 102 in accordance with the lower-level Transmission Control Protocol/Internet Protocol (TCP/IP) and/or the lower-level Unified Datagram Protocol/Internet Protocol (UDP/IP). Likewise, the responses may be sent in IP-defined packets of data in return, and which include the information needed for the server consolidation analysis.

Once a given set of the collector threads 208 has finished its collection functionality, the computer program 110 of the computing device 104 spawns one of the writer threads 210 to store the information that has been collected within the database 212 (314). Different sets of the collector threads 208 may finish at different points in time, based on, for instance, whether different collector threads have been specified to collect information for different lengths of time, whether different collector threads take longer to finish collecting all the desired information, and so on. For the static configuration information for a given one of the servers 108, there may be a single record or entry within the database 212 detailing this information. By comparison, for the dynamic information for a given one of the servers 108, there may be a number of records or entries within the database 212, each of which provides a snapshot of the functionality and/or load of the server at a particular point in time. Prior to storing the dynamic or static information within the database 212, the information may be stored within a single record or data structure, per server, within memory, such as dynamic random-access memory (DRAM). Having such information stored within a single record or data structure, per server, within memory, enhances performance and contributes to the scalability of the data collection process for a large number of servers.

The information collected by the collector threads 208 and stored in the database 212 is then collated or distilled into server utilization-oriented statistics regarding the servers 108, upon completion of all the collector threads 208 (316). Collation or distillation may include grouping the servers 108 by common functionality, common type, common manufacturer, and so on, as well as by different ranges of utilization. The server utilization-oriented statistics are particularly determined based on the dynamic information culled from the servers 108. For example, the overall processor, hard disk drive, and/or memory utilization of each of the servers 108 may be determined, and/or the percentage of time that each of the servers 108 runs or executes given application programs or otherwise performs given functionalities may be determined. Server utilization-oriented statistics may further be divided into days of the week, particular times each day, weekdays versus weekends, and so on, so that network administrators and consultants can obtain an accurate and informed overall picture of the servers 108 and their utilization.

The server utilization-oriented statistics are ultimately reported within the report 214 (318). Such reporting may be in the form of a spreadsheet, so that the statistics can be analyzed in different ways, as permitted by the spreadsheet program, depending on user needs. Additionally, or alternatively, the report 214 may realize the form of a paper or otherwise unchanging document, which may be provided to present an overall summary of the utilization of the servers 108. The computer program 110 of the computing device 104 may thus, by virtue of providing the report, inform or assist such identification by users (320).

Figure 4:
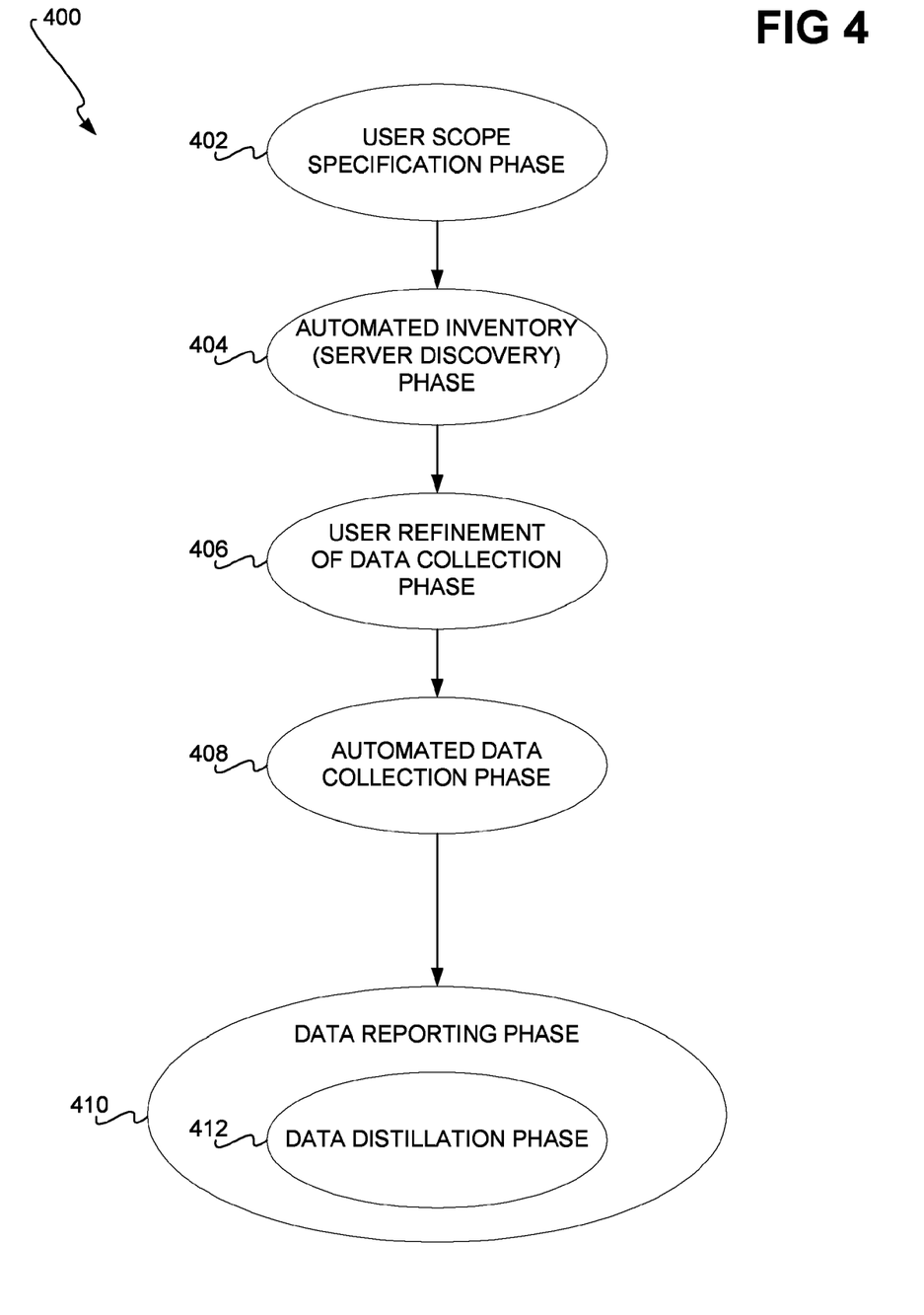
FIG. 4 is a flowchart of a method encompassing six phases of one approach to collecting server-consolidation candidate information, according to an embodiment of the invention.

FIG. 4 shows a method 400 that outlines different phases in the server-consolidation candidate identification process, according to an embodiment of the invention. The method 400 is in at least some embodiments of the invention consistent with the method 300, but approaches the server-consolidation candidate identification process from a different perspective from that of the method 300. The first phase is the user scope specification phase 402. Within the phase 402, the user is able to specify the scope of discovery of the servers 108 communicatively coupled to the network 102. For example, a range of IP addresses may be specified, a list of server names or other server identification information may be specified, and/or name-service repositories may be specified, such as the Domain Name Service (DNS), the Network Basic Input/Output Service (NetBIOS), and so on. Having the user identify the scope of discovery of the servers 108 within the phase 402 narrows the scope of the network 102 that has to be searched for server consolidation candidates.

Furthermore, the user can in one embodiment of the invention specify the types of servers and/or application programs to discover. For example, a user may choose to discover only servers running versions of the Microsoft Windows® operating system, only servers running versions of the Novell NetWare® operating system, and/or only servers running versions of the IBM AIX® operating system. As another example, a user may in addition or alternatively choose only to discover servers on which specific application programs are running, such as versions of the Microsoft SQL® database server program, versions of the IBM DB2® database server program, and/or versions of the Microsoft Exchange mail server program.

The second phase is the automated inventory (server discovery) phase 404. Within the phase 404, the network 102 is scanned to identify the servers 108 that are connected to the network 102, based on the scope specification provided by the user in the earlier phase 402. Non-servers are excluded when discovered, such as those of the devices 106 that are not any of the servers 108. The information collected in the phase 404 may include the server names and their associated IP addresses in one embodiment of the invention. Furthermore, in one embodiment of the invention, the processes running on each of the servers 108 may be collected in the phase 404, to determine the non-system processes consuming the most processing resources on the server, whereas in another embodiment, such processes are collected in phase 410, as described later in the detailed description. Such a determination can aid user identification of which server has been earmarked to perform which functionality.

The third phase is the user refinement of data collection phase 406. Within the phase 406, the user is permitted to select which of the servers 108 that have been discovered in the phase 404 will be subjected to collector threads. As a result, the server names and their associated IP addresses, as well as other information that may have been gleaned in the earlier phase 404 may assist the user in selecting a subset of the servers 108. Furthermore, the user may be permitted to select the type of information that is to be collected from the servers 108 by the collector threads. For instance, a user may determine that only static configuration information is needed, or may determine that dynamic information is only needed for certain of the servers 108, and/or for certain times during which those servers are run, and so on.

The fourth phase is the automated data collection phase 408. Within the phase 408, information is collected from those of the servers 108 selected in the phase 406. The information is collected without installing any computer-executable code on the servers 108, as has been described, such as by using the collector threads 208 spawned by the computer program 110 of the computing device 104. The one or more writer threads 210 may further be employed to write the information collected to the database 212, as has also been described. The fifth phase is the data reporting phase 410, within which a spreadsheet or another type of the report 412 is provided that reports the information collected in the phase 408. Furthermore, as part of the data reporting phase 410, the sixth phase, which is the data distillation phase 412, allows custom server utilization-oriented statistics to be distilled from the information collected in the phase 408. For instance, any summarizing, averaging, and/or processing that is needed or desired of the information may be accomplished, by querying the database 212, using a spreadsheet program, and so on. As such, the user is provided with the flexibility of being able to distill the information that has been stored within the database 212 as desired.

Specific Implementation

Figure 5:
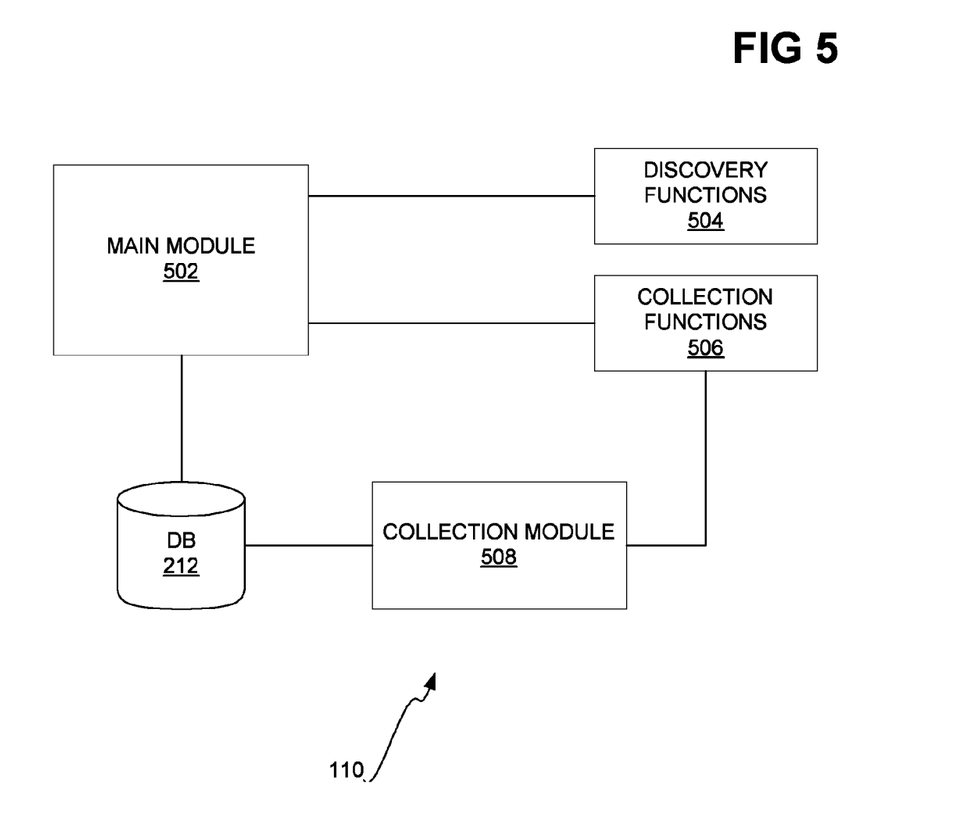
FIG. 5 is a diagram of the architecture of a computer program of a computing device that is able to launch collector threads to collect information from servers without installing any computer-executable code on the servers, according to a specific implementation of an embodiment of the invention.

FIG. 5 shows the architecture of the computer program 110 of the computing device 104, according to a specific implementation in one embodiment of the invention. The computer program 110 is depicted as include a main module 502 and a collection module 508, and discovery functions 504 and collection functions 506. The database 212 is also depicted in FIG. 5.

The main module 502 accesses the discovery functions 504 to discover all the devices 106 on the network 102 of FIG. 1, including the servers 108. The discovery functions 504, therefore, are the programming interfaces by which computer-executable code for determining all the devices 106 on the network is accessed. The main module 502 may further collect information from a given server by accessing the collection functions 506. The collection functions 506, therefore, are the programming interfaces by which computer-executable code for collecting the information for a given type, kind, or platform of the servers 108 is accessed. It is noted that the collection functions 506 can include more than one set of such functions, where each set of the collection functions 506 is responsible for collecting information for a different type, kind, and/or platform of the servers 108. Initial setup of the discovery and collection processes may also be accomplished through the main module 502, such as by the main module 502 providing a graphical user interface (GUI) via which users communicate with the main module 502.

The collection module 508, by comparison, is the part of the computer program 110 that is able to spawn or instantiate the collector threads 208 of FIG. 2 for the servers 108 to collect the information regarding the servers 108, as has been described. As such, the collection module 508 also accesses the collection functions 506. The collection module 508 further spawns or instantiates the one or more writer threads 210 upon the completion of the collector threads 208, in order to write the information collected to the database 212. The main module 502 then, upon user request, reads the information from the database 212 to distill or collate it into server utilization-oriented statistics, as has been described. Each of the main module 502 and the collection module 508 may be one or more sections of computer-executable code, computer software objects, sub-modules, routines, and so on.

Figure 6:
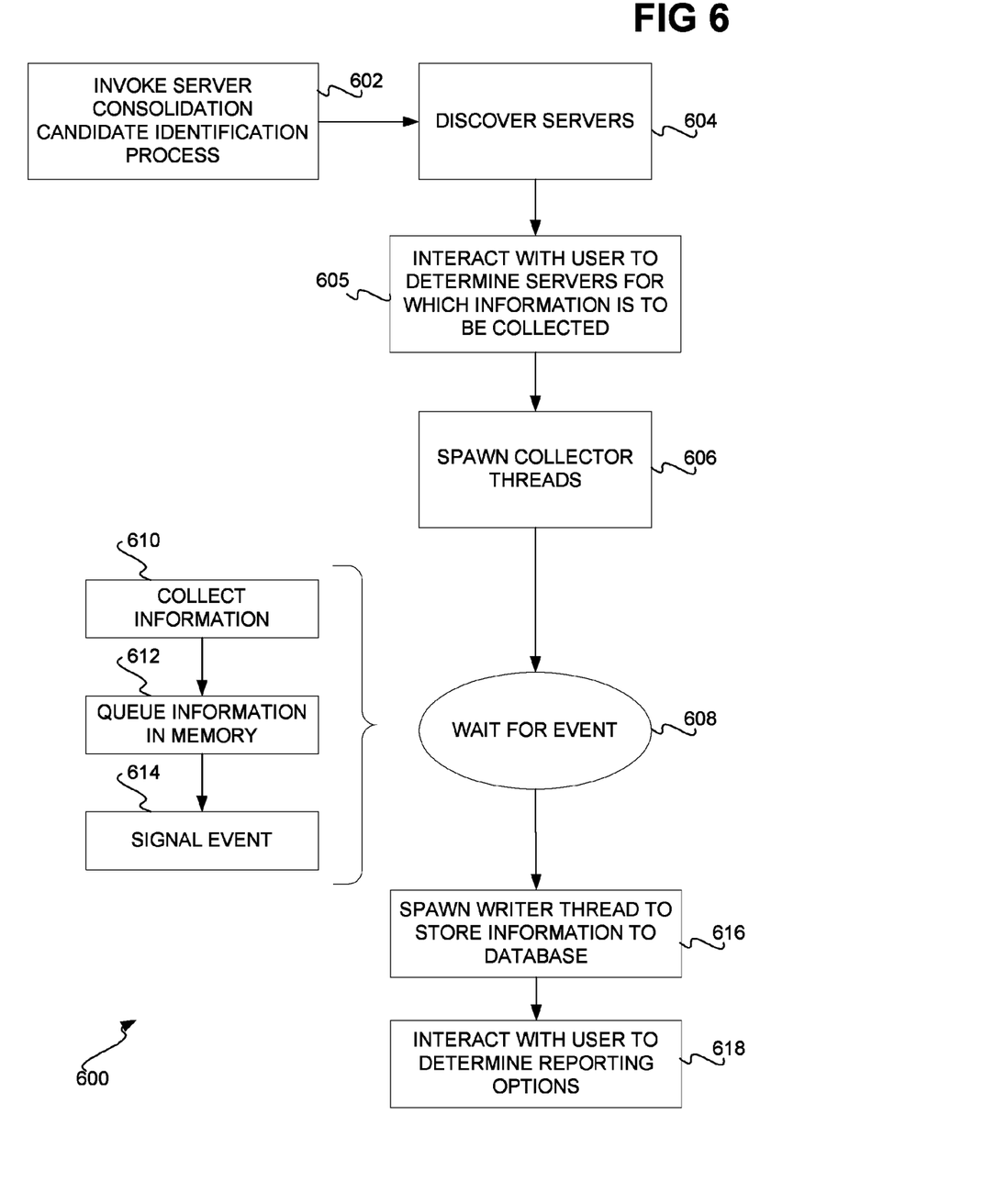
FIG. 6 is a flowchart of a method for collecting information to be used in conjunction with server-consolidation candidate identification, according to a specific implementation of an embodiment of the invention.

FIG. 6 shows a method 600 for collecting information from the servers 108 of FIG. 1 for purposes of identifying candidate servers for server consolidation, according to a specific implementation in one embodiment of the invention. The computer program 110 of the computing device 104 of FIGS. 1 and 2 that has been described may perform the method 600. The server consolidation candidate identification process is initially invoked (602), such as by a user like a network administrator or a consultant.

The main module 502 of FIG. 5 then discovers the servers 108 communicatively connected to the network 102 (604), such as by accessing the discovery functions 504. Next, the main module 502 can interact with the user to determine for which of the servers 108 information is to be collected (605), as well as the type of information to be collected for each of these servers, and how often and for what duration of time the information is to be collected. Thereafter, the collection module 508 spawns the collector threads 208 (606), and waits for collection-completion events from each of the collector threads 208 (608). Each of the collector threads 208 collects the desired static and/or dynamic information from one of the servers 108 (610), by, for instance, accessing the collection functions 506, and queues, or stores, this information in memory, or another computer-readable medium (612).

Next, a collector thread signals a collection-completion event to the collection module 508 (614). In response to detecting or receiving the collection-completion event, the collection module spawns one of the writer threads 210 to store, or write, the information collected to the database 212 (616). The main module 502 may then distill or collate such information into server utilization-oriented statistics, and report these statistics for server consolidation candidate identification purposes. For such purposes, the main module 502 may interact with the user further (618) to determine the type of data reporting that should occur, such as the file name of the spreadsheet, and so on.

Advantages

The data collection approach that has been described for collecting information for server consolidation provides embodiments of the invention with a number of advantages. In particular, the approach provides for scalability, customization, and extensibility. In terms of scalability, the approach is scalable to large numbers of servers for at least three reasons. First, a collect thread is spawned for each target server, and that thread alone performs the entire data collection for the server. If a network or any other type of delay is encountered for a particular server, the delay does not become a bottleneck for data collection of the other servers. Second, when the number of servers is in the hundreds, thousands, or more, data collection can be performed in batches of servers, by having multiple instances of the data collection process run simultaneously. Third, in one embodiment of the invention, a single writer thread is employed that performs the data storage function, so that writing to the database itself does not become a bottleneck or a synchronization problem. Each collector thread may have a designated address within shared memory, and writes its data only to that location. The writer thread may then receive this address from the main thread, and use it to access the data and write it to the database.

In terms of customization, the data collection approach that has been described is customizable for at least two reasons. First, the user may input parameters that govern the data collection process. For example, the user can specify from which target servers information is to be collected, the type and kind of data to be collected from these servers, as well as the location at which the data collected is to be stored. In one embodiment of the invention, the graphical user interface (GUI) may include a wizard-like interface, so that the user can easily accomplish parameter entry. Second, the data collection process exists as an active process only for the duration of a data collection run in one embodiment. Therefore, an external processor scheduler, such as that provided by the underlying operating system, may be employed to schedule periodic data collection runs, which is useful for acquiring dynamic information regarding the servers. The schedule at which the data collection process is run can be specified by the user via the user interface.

In terms of extensibility, the data collection approach that has been described is extensible, too. For instance, the operation of the data collection process is independent of the operating system run on any of the target servers. Depending on the operating system of a given server, a different kind of collector thread is spawned. The collector thread utilizes application programming interfaces (API's) and/or protocols that are specific to the server's operating system to perform the collection. When a new target server operating system needs to be added, only code for the new type of collector thread has to be added. The core of the data collection process remains unchanged.

Alternative Embodiments and Conclusion

Embodiments of the invention have been described primarily in relation to obtaining information from servers for the purpose of server consolidation. However, in other embodiments of the invention, the information collected from the servers may be of a different type, and/or for a different purpose. For instance, the information collected may be for autonomic computing purposes, periodic network inventory reports, software licensing inventory and audits, and so on. That is, the data collection process that has been described may be used in conjunction with other kinds of information to gather from servers on a network, for purposes other than server consolidation.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

We claim:

1. A method performed by a computer program running on a computing device, comprising:
    determining a number of servers communicatively coupled to a network;
    for each server, spawning a collector thread to collect information regarding the server by sending requests to the server and receiving responses from the server, the collector thread being executed on the computing device such that no computer-executable code is installed or spawned on the server itself by the method being performed by the computer program; and,
upon completion of the collector thread for each server, storing the information regarding the server as collected to a database by spawning a single writer thread by the computer program, the single writer thread executed on the computing device, such that while there are multiple collector threads corresponding to the multiple servers, there is just one single writer thread for all the collector threads.

2. The method of claim 1, wherein the collector thread is spawned and run at the computing device that is different than the number of servers.

3. The method of claim 1, wherein the information collected by the collector thread is related to server-consolidation-needed information.

4. The method of claim 1, wherein determining the number of servers communicatively coupled to the network comprises:
determining a number of devices communicatively coupled to the network; and,
determining which of the number of devices is a server, based on information returned from each device in discovering the device on the network.

5. The method of claim 1, wherein spawning the collector thread for each server to collect information regarding the server from the server comprises sending information requests by the collector thread to the server to determine at least one of: static configuration information regarding the server, and dynamic load-oriented and function-oriented information regarding the server.

6. The method of claim 5, further comprising collating the dynamic load-oriented and function-oriented information regarding the server to determine whether the server is a candidate for consolidation with one or more other servers.

7. The method of claim 1, wherein storing the information regarding the server as collected to the database comprises, upon completion of the collector thread for each server, spawning one or more writer threads to write the information regarding the server as collected to the database.

8. The method of claim 1, further comprising, after determining the number of servers communicatively coupled to the network, permitting a user to select which of the servers for which collector threads are to be spawned.

9. The method of claim 1, further comprising, after determining the number of servers communicatively coupled to the network, collecting information regarding processes running on each server consuming most resources of the server for subsequent user analysis.

10. The method of claim 1, further comprising distilling the information regarding each server as stored to the database to determine server utilization-oriented statistics regarding the server.

11. The method of claim 10, further comprising identifying server-consolidation candidates among the number of servers based on the server utilization-oriented statistics determined for each server.

12. A method for assisting selection of one or more servers from a number of servers for server consolidation comprising:
spawning collector threads on a computing device other than one of the servers to collect server consolidation-related information from the servers;
storing and distilling the server consolidation-related information to determine server utilization-oriented statistics regarding the servers;
reporting the server utilization-oriented statistics regarding the servers to inform selection of the one or more servers for server consolidation; and,
spawning a single writer thread by a computer program running on the computing device, the single writer thread executed on the computing device, such that while there are multiple collector threads corresponding to the multiple servers, there is just one single writer thread for all the collector threads.

13. The method of claim 12, wherein the server consolidation-related information comprises dynamic load-oriented and function-oriented information collected over a period of time and static configuration information collected at least once.

14. The method of claim 12, further comprising spawning one or more writer threads on the computing device to store the server consolidation-related information to a database, from which the information is distilled to determine the server utilization-oriented statistics.

15. A computing device comprising:
one or more processors;
one or more network communication mechanisms to enable the computing device to communicatively couple to a network having a number of servers; and,
a computer-readable medium storing a computer program executable by the processors to collect dynamic load-oriented and function-oriented information and static configuration information regarding the servers without installing any computer-executable code on the servers and without writing any information to the servers, by:
for each of the servers, spawning a collector thread to collect information regarding the server, the collector thread being executed on the computing device such that no computer-executable code is installed or spawned on the server itself, and
spawning a single writer thread, the single writer thread executed on the computing device, such that while there are multiple collector threads corresponding to the multiple servers, there is just one single writer thread for all the collector threads.

16. The computing device of claim 15, wherein the computer program is to spawn the collector threads for the servers that send requests to the servers and receive responses from the servers to collect the dynamic load-oriented and function-oriented information and the static configuration information regarding the servers.

17. The computing device of claim 15, wherein the dynamic load-oriented and function-oriented information is collected periodically over a period of time.

18. The computing device of claim 15, wherein the computer program is also to discover the number of servers on the network.

19. The computing device of claim 15, wherein the computer program is also to collate the dynamic load-oriented and function-oriented information and the static configuration information regarding the servers to determine server utilization-oriented statistics to inform selection of one or more of the servers for server consolidation.

20. The computing device of claim 15, further comprising a database at which the dynamic load-oriented and function-oriented information and the static configuration information are stored by the computer program.

21. The computing device of claim 20, wherein the computer program is to spawn the writer thread to write the dynamic load-oriented and function-oriented information and the static configuration information to the database for subsequent analysis and reporting to inform selection of one or more of the servers for server consolidation.

22. A computing device comprising:
one or more network communication mechanisms to enable the computing device to communicatively couple to a network having a number of servers; and,
means for collecting information regarding the servers via collector threads to inform selection of one or more of the servers for server consolidation, by:
for each of the servers, spawning a collector thread to collect information regarding the server, the collector thread being executed on the computing device such that no computer-executable code is installed or spawned on the server itself, and
spawning a single writer thread, the single writer thread executed on the computing device, such that while there are multiple collector threads corresponding to the multiple servers, there is just one single writer thread for all the collector threads.

23. The computing device of claim 22, wherein the means is further for spawning the collector threads that send requests to the servers and receive responses from the servers to collect the information regarding the servers.

24. The computing device of claim 22, wherein the means is further for spawning the writer thread that is to write the information collected to a database for subsequent analysis and reporting.

25. An article of manufacture comprising:
a non-transitory computer-readable medium; and,
means in the medium for collecting information regarding the servers without installing any computer-executable code on the servers to inform selection of one or more of the servers for server consolidation, by:
for each of the servers, spawning a collector thread to collect information regarding the server, the collector thread being executed on a computing device such that no computer-executable code is installed or spawned on the server itself, and
spawning a single writer thread, the single writer thread executed on the computing device, such that while there are multiple collector threads corresponding to the multiple servers, there is just one single writer thread for all the collector threads.

26. The article of claim 25, wherein the means is further for spawning the collector threads that send requests to the servers and receive responses from the servers to collect the information regarding the servers.

27. The article of claim 25, wherein the means is further for spawning the writer thread that is to write the information collected to a database for subsequent analysis and reporting.

28. A system comprising:
a network;
a plurality of servers communicatively coupled to the network; and,
a computing device communicatively coupled to the network to collect information regarding the servers without installing computer-executable code on the servers to assist selection of one or more of the servers for server consolidation, by:
for each of the servers, spawning a collector thread to collect information regarding the server, the collector thread being executed on the computing device such that no computer-executable code is installed or spawned on the server itself, and
spawning a single writer thread, the single writer thread executed on the computing device, such that while there are multiple collector threads corresponding to the multiple servers, there is just one single writer thread for all the collector threads.

29. The system of claim 28, wherein the computing device is to spawn the collector threads for the servers to send requests to the servers and receive responses from the servers to collect the information regarding the servers.

30. The system of claim 29, wherein each collector thread exists for a period of time, during which the collector thread sends periodic requests to the servers and receives responses therefrom to collect dynamic information regarding the servers that potentially changes over the period of time.

* * * * *